US006800261B1

(12) United States Patent
Borsboom et al.

(10) Patent No.: US 6,800,261 B1
(45) Date of Patent: Oct. 5, 2004

(54) PROCESS FOR THE REMOVAL OF SULPHUR COMPOUNDS FROM GASES

(75) Inventors: Johannes Borsboom, Rijswijk (NL); Petrus Franciscus Maria Theresia van Nisselrooij, Nijmegen (NL)

(73) Assignees: Gastec N.V., Apeldoorn (NL); Jacobs Nederland B.V., Leiden (NL)

( * ) Notice: Subject to any disclaimer, the term of this patent is extended or adjusted under 35 U.S.C. 154(b) by 0 days.

(21) Appl. No.: 10/089,578

(22) PCT Filed: Sep. 29, 2000

(86) PCT No.: PCT/NL00/00695

§ 371 (c)(1),
(2), (4) Date: Aug. 12, 2002

(87) PCT Pub. No.: WO01/23075

PCT Pub. Date: Apr. 5, 2001

(30) Foreign Application Priority Data

Sep. 30, 1999 (EP) ............................................. 99203194

(51) Int. Cl.$^7$ ............................................... C01B 17/04
(52) U.S. Cl. .............................. 423/244.09; 423/244.1; 423/564; 423/567.1; 423/574.1; 423/576.8
(58) Field of Search ................................. 423/539, 542, 423/563, 564, 573.1, 574.1, 576.8, 567.1, 244.09, 244.1

(56) References Cited

U.S. PATENT DOCUMENTS 3,947,547 A    3/1976   Loof et al. .................. 423/242
4,479,928 A  * 10/1984  Voirin ...................... 423/567.1
4,511,668 A  *  4/1985  Nozue et al. .................. 502/84
4,552,746 A  * 11/1985  Kettner et al. ........... 423/567.1
4,857,297 A  *  8/1989  Kettner et al. ........... 423/567.1
5,512,260 A     4/1996  Kiliany et al. ........... 423/242.1
5,948,382 A  *  9/1999  Li et al. .................. 423/573.1

FOREIGN PATENT DOCUMENTS

FR          2 240 180        3/1975
WO        WO 94/11105        5/1994

OTHER PUBLICATIONS

Kohl et al. *Gas Purification* (4th Ed.), Gulf Publishing Co. USA, ISBN 0–87201–314–6, pp. 420–428, 1985.*

* cited by examiner

*Primary Examiner*—Wayne A. Langel
(74) *Attorney, Agent, or Firm*—Weingarten, Schurgin, Gagnebin & Lebovici LLP

(57) ABSTRACT

The invention is directed to a process for the catalytic reduction of sulphur dioxide from a gas mixture at least containing 10 vol. % of water, in which process the gas mixture is passed over a sulphur resistant hydrogenation catalyst in sulphidic form, at a space velocity of at least 2000 h$^{-1}$, in the presence of a reducing component, preferably at least partly consisting of hydrogen, in a molar ratio or reducing component to sulphur dioxide of more than 10 up to 100, at a temperature of 125° C. to 300° C., followed by passing the gas mixture, after the said reduction, through a dry oxidation bed for the oxidation of sulphur compounds, more in particular hydrogen sulphide, to elemental sulphur.

33 Claims, No Drawings

PROCESS FOR THE REMOVAL OF SULPHUR COMPOUNDS FROM GASES

The invention relates to a process for the removal of sulphur compounds from gases by catalytic reduction of sulphur dioxide, present in gas mixtures.

The necessity of purifying gases, which are further treated in chemical processes, or supplied to buyers, or discharged to the atmosphere, from sulphur compounds, in particular hydrogen sulphide, is generally known. Accordingly, there exist a number of processes, which are directed towards the removal of hydrogen sulphide from gas.

The best known and most suitable process for removing sulphur from gas by recovering sulphur from hydrogen sulphide is the Claus process. In this process hydrogen sulphide is converted by oxidation to a considerable extent into elemental sulphur; the sulphur thus obtained is separated from the gas by condensation. The residual gas stream (the Claus tail gas) still contains some $H_2S$ and $SO_2$.

The method of recovering sulphur from sulphur containing gases by the Claus process is based on the following overall reactions:

$$2H_2S+3O_2 \rightarrow 2H_2O+2SO_2 \qquad (1)$$

$$4H_2S+2SO_2 \leftrightharpoons 4H_2O+6/nS_n \qquad (2)$$

Reactions (1) and (2) result in the main reaction:

$$2H_2S+O_2 \leftrightharpoons 2H_2O+2/nS_n \qquad (3)$$

A conventional Claus converter—suitable for processing gases having an $H_2S$ content of between 50 and 100%—comprises a burner with a combustion chamber and a condenser, the thermal stage, followed by a number of reactor stages—generally two or three. These reactor stages constitute the so-called catalytic stages and consist each of a reactor filled with catalyst and a sulphur condenser.

In the thermal stage, the incoming gas stream, which is rich in $H_2S$, is combusted with an amount of air, at a temperature of approximately 1200° C. This amount of air is adjusted so that one third of the $H_2S$ is fully combusted to form $SO_2$ in accordance with the following reaction:

$$2H_2S+3O_2 \rightarrow 2H_2O+2SO_2 \qquad (1)$$

After this partial oxidation of $H_2S$ the non-oxidised part of the $H_2S$ (i.e. basically two-thirds of the amount offered) and the $SO_2$ formed react further to a considerable portion, in accordance with the Claus reaction $$4H_2S+2SO_2 \leftrightharpoons 4H_2O+3S_2 \qquad (2^a)$$

The gases coming from the combustion chamber are cooled to about 160° C. in a sulphur condenser, in which the sulphur formed is condensed, which subsequently flows into a sulphur pit through a siphon.

Thus, in the thermal stage, approximately 60% of the $H_2S$ is converted into elemental sulphur.

The non-condensed gases, in which the molar ratio of $H_2S:SO_2$ is unchanged and still 2:1, are subsequently heated to about 250° C. and passed through a first catalytic reactor in which the equilibrium $$4H_2S+2SO_2 \leftrightharpoons 4H_2O+6/nS_n \qquad (2)$$

is established.

The gases coming from this catalytic reactor are subsequently cooled again in a sulphur condenser, in which the liquid sulphur formed is recovered and the remaining gases, after being re-heated, are passed to a second catalytic reactor.

In the Claus process, $H_2S$ is not quantitatively converted to elemental sulphur, mainly due to the fact that the Claus reaction is an equilibrium reaction and therefore the conversion of $H_2S$ and $SO_2$ to elemental sulphur is not complete:

$$2H_2S+SO_2 \leftrightharpoons 2H_2O+3/nS_n \qquad (2^b)$$

A residual amount of $H_2S$ and $SO_2$ remains. Now, generally it is not allowed to discharge residual gas containing $H_2S$ to the atmosphere, and so the gas is oxidised, with the hydrogen sulphide and other sulphur compounds as well as the elemental sulphur present in the gaseous phase being oxidised to sulphur dioxide. With the environmental requirements becoming stricter, this will not be allowed anymore because the sulphur dioxide emission involved is too high. It is therefore necessary to further treat the residual gas of the Claus installation, the so-called tail gas, in a so-called tail gas treater.

Tail gas processes are known to those skilled in the art. The most well-known tail gas processes are the SCOT process, the BSR Selectox process, the Claus sub-dewpoint processes such as Sulfreen, CBA and MCRC, and the Superclaus™ process.

The SCOT process is an effective process for the treatment of tail gas (See GB-A-1, 356,289). In this process the tail gas, together with hydrogen, is passed over a cobalt oxide/molybdenum oxide catalyst on an $Al_2O_3$ carrier, all sulphur components present thus being catalytically reduced to $H_2S$. The total amount of $H_2S$ is then separated from the Claus tail gas in a conventional manner by absorption in a suitable liquid. The $H_2S$ is recovered from the liquid absorbent and recycled to the Claus thermal stage. One drawback of the SCOT process is that it requires an expensive and complicated installation. Another drawback is the high energy consumption involved in removing the hydrogen sulphide from the absorbent again.

In the SCOT process a hydrogenation catalyst is used which is based on a carrier material, usually $\gamma$-$Al_2O_3$ with a high specific catalytic surface area of typically more than 300 m²/g, the carrier material being provided with active compounds such as molybdenum, cobalt and/or nickel for the hydrogenation function. In the SCOT hydrogenation reactor all sulphur components are converted to $H_2S$ according to $$SO_2+3H_2 \rightarrow H_2S+2H_2O \qquad (4)$$

$$1/nS_n(\text{vapour})+H_2 \rightarrow H_2S \qquad (5)$$

$$COS+H_2O \rightarrow H_2S+CO_2 \qquad (6)$$

$$CS_2+2H_2O \rightarrow 2H_2S+CO_2 \qquad (7)$$

In this process it is essential that all sulphur species are converted to $H_2S$ down to the ppmv level over the hydrogenation catalyst, in order to prevent corrosion and plugging with solid sulphur in downstream equipment. For instance, partial catalytic hydrogenation of $SO_2$ to sulphur vapour or a mixture of sulphur vapour and $H_2S$ is not allowed for the SCOT process. In order to achieve complete hydrogenation to hydrogen sulphide and complete hydrolysis of COS and $CS_2$, high catalyst bed temperatures in the range of 280–330° C. as well as low space velocities are required. A process of this kind, using complete conversion of the sulphur species to hydrogen sulphide is described in GB-A 1,480,228.

An alternative way to remove hydrogen sulphide from tail gas is partial oxidation to elemental sulphur, as in the so-called BSR Selectox process, described in U.S. Pat. No. 4,311,683. According to this process the Claus tail gas is hydrogenated, water is removed and the $H_2S$ containing gas, mixed with oxygen, is passed over a catalyst containing vanadium oxides and vanadium sulphides on a non-alkaline, porous, refractory oxidic carrier.

An important drawback of both the SCOT process and the BSR Selectox process is that in both cases the tail gas, after hydrogenation of the sulphur components to $H_2S$, must first be cooled in order to remove the water for the greater part. Water greatly interferes with the absorption or the oxidation of $H_2S$. Due to the high investments involved, the costs of tail gas treatments according to these known methods are high.

In the SUPERCLAUS™ process the Claus tail gas is subjected to further treatment, whereby $H_2S$ present in the tail gas is selectively oxidised to elemental sulphur in a dry bed oxidation stage.

In U.S. Pat. No. 4,988,494, one of the basic patents for the SUPERCLAUS™ process, it is described that the $H_2S$ concentration in the gas leaving the last catalytic Claus stage is increased to a value ranging between 0.8 and 3% by volume by reducing the quantity of combustion or oxidation air passed to the Claus thermal stage.

The increase of the $H_2S$ concentration in the Claus tail gas, will result in a decreased $SO_2$ concentration in said tail gas, however, not to very low levels. For an $H_2S$ concentration of 0.8% by volume, the $SO_2$ concentration will be typically 0.03–0.15% by volume, and this will still result in a sulphur recovery efficiency loss of typically 0.09–0.45%.

In EP-A 669,854 a process for sulphur recovery is described which makes use of selective hydrogenation of $SO_2$ to elemental sulphur. This patent suggest the use of a cobalt-molybdenum catalyst on a γ-alumina support, as is used in the SCOT process.

During the Fourth Sulfur Technology Conference, Nov. 5–6, 1998, Houston, Tex., USA, a paper has been presented, "PROClaus Process: An Evolutionary Enhancement to Claus Performance". In this paper the selective hydrogenation of $SO_2$ in Claus tail gas to elemental sulphur is described, using a catalyst in the last catalytic Claus reactor which is basically a Claus catalyst with additional hydrogenating properties. This hydrogenation stage is followed by selective oxidation of $H_2S$ to elemental sulphur.

In order to perform selective hydrogenation of $SO_2$ to sulphur vapour instead of to hydrogen sulphide, the temperature of the gas should be reduced significantly and the ratio of hydrogen to sulphur dioxide should be low. However, the data in the paper show that the reduced temperature needed for a sufficiently selective conversion to sulphur, results in a decrease of overall $SO_2$ conversion.

The process of selective reduction to elemental sulphur is thus rather restricted in process conditions and requirements, with the consequence, that difficult and costly measures are required to meet the criteria for the selective reduction to elemental sulphur. One example thereof is the necessary reduction of the $H_2$-content of the gas mixture. A further disadvantage of the proposed process resides therein, that the temperature needs to be high, because of the required conversion of $SO_2$. High temperatures promote the reaction of elemental sulphur vapour with hydrogen, resulting in decreased yields to sulphur. As a result the product gas of this PROClaus process is still relatively rich in $H_2S$ and $SO_2$.

Accordingly, this process of selective hydrogenation of $SO_2$ to elemental sulphur is not a viable alternative for providing an increase in sulphur yield.

Even though these considerations direct the skilled person away from using a hydrogenation step in relation to treatment of Claus tail gas, the inventors have realised, that the hydrogenation of sulphur dioxide might provide a new way to improve the sulphur recovery from Claus tail gases.

An important aspect in this is the fact that Claus tail gas contains a considerable amount of water vapour, which amount may be within the range of 10–40% by volume. The water vapour strongly promotes the reversing Claus reaction.

$$3/nS_n + 2H_2O \leftrightarrows 2H_2S + SO_2 \qquad (2^c)$$

The effectiveness with respect to the removal of $SO_2$ by selective conversion to elemental sulphur can in general be adversely affected by the occurrence of reaction $2^c$.

The sulphur formed by $SO_2$ reduction, reacts back with the water vapour to form hydrogen sulphide and sulphur dioxide.

The substantial removal of water vapour has evident technical disadvantages, such as the necessity of an additional cooling/heating stage, an additional sulphur removal stage or a hydrogenation stage followed by a water-removing quench stage.

The occurrence of the side reaction mentioned above is partly determined by practical conditions, such as temperature, contact time, water vapour content, sulphur vapour content and catalytic activity, and has the effect that the sulphur yield is decreased.

The present invention has accordingly as one of its objects to provide a process for the removal of sulphur compounds from gas mixtures, in an economic manner, without too much unit operations being necessary. Another object is to improve the sulphur recovery from Claus tail gases, compared to conventional methods. Also it is an object to provide a process for the reduction of sulphur dioxide to hydrogen sulphide and/or elemental sulphur in water containing gas mixtures, which process is suitable for incorporation in various sulphur recovery processes, to improve the sulphur recovery therewith.

One further object is to prevent that too much sulphur vapour that is already present in Claus tail gas is hydrogenated, resulting in a further load to the subsequent selective oxidation.

The present invention is based on the discovery that the hydrogenation of $SO_2$ in Claus tail gas to $H_2S$ and/or to elemental sulphur, followed by the selective oxidation of $H_2S$ to elemental sulphur, can be used as a means for the removal of $SO_2$, in an efficient manner. It has been found that the sulphur recovery can be improved by suppressing the side reactions leading back to the generation of $SO_2$ and $H_2S$. This can be done in various ways, the most important ones being the use of the reaction kinetics and the use of a catalyst that is not active in promoting the Claus reaction.

The reduction of $SO_2$ and sulphur vapour according to $$SO_2 + 2H_2 \rightarrow 1/nS_n + 2H_2O \qquad (8)$$

$$SO_2 + 3H_2 \rightarrow H_2S + 2H_2O \qquad (4)$$

$$1/nS_n + H_2 \rightarrow H_2S \qquad (5)$$

$$SO_2 + 2CO \rightarrow 1/nS_n + 2CO_2 \qquad (9)$$

is thermodynamically complete and is not reversible, in contrast to the Claus reaction.

It has been found that the reduction of $SO_2$ (equations 8, 4 and 9) proceeds faster than the reaction of sulphur vapour and hydrogen to $H_2S$. By applying a sufficiently high space velocity, the majority of the $SO_2$ is reduced, without the need to restrict the amount of hydrogen and/or CO in the system or to lower the temperature.

The invention accordingly relates to a process for the removal of sulphur dioxide from a gas mixture at least containing 10 vol. % of water, in which process the gas mixture is passed over a sulphur resistant hydrogenation catalyst in sulphidic form, at a space velocity (Gas Hourly Space Velocity: GHSV) of at least 2000 $h^{-1}$, in the presence of a reducing component, preferably at least partly consisting of hydrogen, in a molar ratio of reducing component to sulphur dioxide of more than 10 up to 100, at a temperature of 125° C. to 300° C., followed by passing the gas mixture, after the said reduction, through a dry oxidation bed for the oxidation of sulphur compounds, more in particular hydrogen sulphide, to elemental sulphur.

The invention is also concerned with a process for the removal of hydrogen sulphide from gas mixtures, said process comprising the steps of converting part of the hydrogen sulphide into sulphur dioxide, subjecting the mixture to the Claus reaction in at least one catalytic reactor, subjecting the sulphur dioxide present in the resultant gas mixture to a catalytic reduction step using the above described process, and selectively oxidising the hydrogen sulphide present in the resulting gas mixture to elemental sulphur.

The present invention is based on the surprising discovery, that by careful selection of process conditions, it is possible to remove sulphur dioxide from a gas mixture containing substantial amounts of water, without difficulty, and without the need of difficult measures to obtain the correct process conditions, such as gas composition. The process of the present invention, in view of its carefully balanced optimal process conditions, allows the hydrogenation and subsequent conversion to elemental sulphur, of sulphur dioxide in various gas mixtures, such as Claus tail gas. More in particular the present invention allows the operation of the process within a suitable window of operating conditions, while obtaining a suitably high level of sulphur recovery.

In the process of the invention, the use of the additional hydrogenation step with the specific process conditions leads to a greatly improved system for sulphur recovery. Not only is the sulphur recovery increased due to the additional amount of $SO_2$ that is converted, but also the process allows the Claus process to operate more efficiently, as it is not necessary to control the process air to the thermal stage at an increased hydrogen sulphide level in the tail gas going to the selective oxidation reactor. This results in a higher conversion in the Claus process (higher sulphur recovery efficiency). This increased conversion in the Claus process lowers the load in the selective oxidation step, which again is advantageous for the sulphur yield in the selective oxidation step.

It is thus clear that the specific combination of features of the present invention provides for a greatly improved operation of the process and greatly increased sulphur yield. A further aspect resides therein, that the process control is easier than in the prior art tail gas treatment processes. In general it can be said that the present invention provides therefor that the operation of the various process steps falls better in the operating window (for example because of lower load), thus enabling a better performance of the process step. Further, the gas fed to the selective oxidation step contains less $SO_2$, which has the consequence that a lower starting temperature can be used in the selective oxidation step, which is advantageous for the sulphur yield.

It it to be noted, that the hydrogenation of sulphur dioxide will proceed at least partly to hydrogen sulphide, although also elemental sulphur may be formed. The present inventors have been the first to realise that, when using the catalytic hydrogenation reaction of $SO_2$, it is important for the sulphur yield that the reverse Claus reaction is suppressed, at least by the selected reaction conditions and preferably also by the properties of the catalyst.

One of the advantages of using the invention resides in the fact that a high conversion of $SO_2$ is obtained at a low temperature, whereas at the same time only a low conversion of sulphur vapour into $H_2S$ is maintained, in the presence of substantial amounts of water vapour.

Important considerations in the process are i.a. the space velocity, which should be at least 2000 $h^1$, which is very high compared to conventional Claus and Claus tail gas processes. Space velocity is defined as $Nm^3$ gas/$m^3$ catalyst/hour. The upper limit can generally be kept below 12000 $h^{-1}$, more preferred below 10000 $h^{-1}$.

In the gas containing $SO_2$, also CO is usually present. Because of the reducing properties of CO, this component is capable of reducing $SO_2$. In this way CO acts in the same way as hydrogen, and a mixture of hydrogen and CO is therefor also suitable for reducing $S_2$, either directly (Eq. 9) or indirectly via $H_2$ production in the water-gas shift reaction (Eq. 10).

$$SO_2 + 2CO \rightarrow 2CO_2 + 1/nS_n \qquad (9)$$

$$CO + H_2O \leftrightarrows CO_2 + H_2 \qquad (10)$$

In order to obtain a good and fast reduction, the amount of reducing component (hydrogen and/or CO), should be high; on molar basis more than 10 times the amount of sulphur dioxide. The advantage thereof is that there is a fast and efficient removal of $SO_2$.

Excess of hydrogen compared to $SO_2$ is normally present in the Claus tail gas of a sulphur recovery unit. The hydrogen in the tail gas is produced in the thermal stage of the sulphur plant, one of the main reactions for hydrogen production being the thermal cracking of $H_2S$ $$2H_2S \rightarrow 2H_2 + S_2 \qquad (11)$$

The excess of hydrogen compared to $SO_2$ in the Claus tail gas is determined by the Claus process, and cannot be controlled easily. In case additional hydrogen is required, this can he generated by sub-stoichiometric combustion of fuel gas in the in-line reheaters, or added to the tail gas in the form of a concentrated hydrogen stream from outside battery limit. Removal of hydrogen, as is necessary for the selective reduction of $SO_2$ to elemental sulphur as described in EP-A 696,854, is very difficult and cost ineffective. According to the present invention it is not relevant whether sulphur dioxide is converted to hydrogen sulphide or to elemental sulphur.

The process of the invention has the advantage that little or no hydrogenation of sulphur vapour, coming from the Claus unit occurs, which would otherwise lead to a further load of the subsequent oxidation stage.

The catalyst to be used in the present invention should be catalytically active in the hydrogenation of $SO_2$ to elemental sulphur and/or to $H_2$. Generally this means that the catalyst preferably consists of a support and a catalytically active material.

As an effective catalytically active material at least one Group VIB, VIIB or VIII, preferably a molybdenum or tungsten compound is used, or a mixture of molybdenum, tungsten, nickel and cobalt compounds, optionally in combination with one or more promoting compounds of non-metals.

The active component is present on the carrier in an amount preferably in the range of 0.1–40% by weight, more preferably 0.1–10% by weight calculated on the total weight of the catalyst, and 60–99.9% of a carrier material.

The catalyst has to be in the sulphided form in order to be suitable. Sulphided catalysts are known as such. Generally, sulphiding is done by contacting the catalyst with $H_2S$, an organic sulphur containing compound, such as dimethyldisulphide or sulphur, prior to use. The catalyst may contain one or more promoting materials. Suitable promoting materials according to the invention are phosphorus compounds. These can be applied to the catalyst inter alia by impregnation with a soluble phosphorus compound.

It is preferred to use for the reduction step a catalyst on a support, said support having substantially no activity towards the Claus reaction, as defined later on. By this aspect of the invention a further improvement of the sulphur recovery occurs, in view of the absence of the reverse Claus, reactions, which reaction would result in the production of $SO_2$. More in particular this embodiment is of importance in the case that the Claus tail gas contains substantial amounts of CO (i.e. over 0.5% by vol). It has been found that the production of COS, an undesired by-product, leading to a decrease in the sulphur recovery, is strongly depressed by the use of a hydrogenation catalyst having substantially no catalytic activity towards the Claus reaction.

The properties required of the support material (concerning Claus activity) depend on the embodiment. In case the Claus activity of the support is not very important, any conventional support for a hydrogenation catalyst may be used. In the preferred embodiment discussed here above, the support consists of a material that is not active towards the Claus reaction. Suitable supports therefor are, i.a. silica, α-alumina, silica alumina, zirconia, carbon (fibres), carbides, phosphates (such as aluminium phosphate).

It is noted that in the present invention the absence of Claus activity is defined in the experimental part, preceding the examples. This definition of the Claus activity is based on direct measurement of the Claus reaction activity, according to the reaction $$2H_2S+SO_2 \rightleftharpoons 3/nS_n+2H_2O \qquad (2^b)$$

If a material is Claus active, the presence of water results in the reaction taking place in the direction of $H_2S$ and $SO_2$, with a part of the sulphur being converted to $H_2S$ and $SO_2$ again. $SO_2$ is then hydrogenated with the $H_2$ present to sulphur and water vapour, whereafter the Claus active catalyst converts the sulphur back into $SO_2$. Due to the concurrence of these reactions a catalyst with Claus active sites will in the presence of water give rise to a strong decrease in conversion, according to $$(2^b)$$

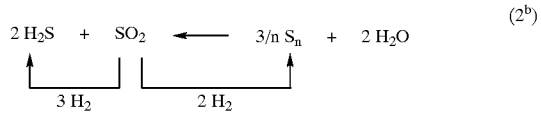

The specific surface area of the catalyst according to the invention can be considerably higher than at least 5 m²/g, since a good activity can be obtained with such values. However, it is also possible to use a catalyst having a low BET surface area, such as α-alumina based hydrogenation catalysts.

Preferably, the specific surface area of the catalyst will not be larger than 300 m²/g of catalyst. In general no specific additional advantages are gained with higher values.

Within the scope of the invention "specific surface area" means the BET surface area as defined by S. Brunauer et al., in J.A.C.S. 60, 309 (1938). The BET surface area is determined by nitrogen adsorption at 77 K according to the so-called three-point measurement. In the calculation the surface area of a nitrogen molecule is set at 16.2 Å².

In principle the catalysts can be prepared by the known methods of preparing (supported) catalysts.

According to the process of the invention sulphur dioxide is removed by reduction, by passing a sulphur dioxide containing gas together with a reducing agent containing gas over the sulphided catalyst at an elevated temperature.

The reduction is carried out by adding such an amount of reduction component, such as hydrogen or an hydrogen containing gas, to the sulphur dioxide containing gas, using a known per se ratio regulator, that the molar ratio of reduction component to sulphur dioxide is from more than 10, up to 100, and preferably up to 50.

The process according to the invention can be used for the treatment of all gases, which comprise sulphur dioxide.

The process according to the invention is eminently suitable for treatment of gas mixtures which do not contain more than 1.0% of $SO_2$, because then a normal, adiabatically operating reactor can be used.

In the hydrogenation the inlet temperature of the catalyst bed is selected above 125° C. and preferably above 170° C. This temperature is partly dictated by the requirement that the temperature of the catalyst bed should be above the solidification temperature of liquid sulphur (115° C.) and also above the dew point temperature of the sulphur.

By known per se measures the maximum temperature in the catalyst bed is generally maintained below 300° C. and preferably below 250° C.

If the $SO_2$ content is higher than 1.0% by volume it may be necessary to take steps in order to prevent the temperature in the hydrogenation reactor from becoming too high due to the reaction heat released. Such steps include for instance the use of a cooled reactor, for instance a tubular reactor, where the catalyst is in a tube which is surrounded by a coolant. Such a reactor is known from European patent specification 91551. A reactor containing a cooling element may also be employed. Further, it is possible to return the treated gas to the reactor inlet after cooling, and thus an additional dilution of the gas to be hydrogenated is attained.

The process according to the invention can be utilised with particular advantage for the hydrogenation of the sulphur dioxide containing residual gases coming from a Claus plant. Because of the very high selectivity of the catalyst for the reduction of $SO_2$, compared to the reverse Claus reaction, a very important additional advantage is thus obtained in that the removal of water prior to the hydrogenation is no longer required. If the process according to the invention is used to oxidise the residual gases referred to, these gases are passed directly to a selective oxidation stage.

If in the process according to the invention the sulphur vapour containing gas coming from the hydrogenation stage, optionally after condensation and separation of the greater part of the sulphur, is passed over a bed in which the sulphur is removed by capillary absorption, or the gas is further cooled in a so-called Deep Cooler to below the solidification temperature of sulphur, see European application 0655414. the sulphur recovery percentage is increased to more than 99.5%.

In a particularly preferred embodiment the catalyst of the invention is used as a separate bed close to the outlet of the last (second) catalytic Claus reactor. Because of the careful selection of process conditions, the use of such a bed results in a particularly efficient hydrogenation of substantially only the sulphur dioxide to hydrogen sulphide. A further advantage of this embodiment resides therein, that it is not necessary to install an additional reactor in an existing plant. Instead thereof only a thin layer of catalyst can be placed in the bottom of the said last reactor, using the prevailing reaction conditions in the reactor. Thereby the sulphur dioxide is hydrogenated.

Experimental Part

The Claus activity of a carrier material is established by the following test.

A tubular quartz reactor, with an internal diameter of 15 mm, is filled with 4 ml of the carrier material. On the one hand, the carrier particle size should be less than 10% of the internal reactor diameter and, on the other hand, it should be sufficiently large to avoid excessive pressure drop across the reactor. Such particles may be obtained by compressing a carrier powder into tablets, subsequently crushing the tablets and sieving the crushed material with sieves of the appropriate mesh size. Carrier materials in the shape of, for instance, extrusions or beads can simply be crushed and sieved to the appropriate size.

The filled reactor is placed in a furnace, which ensures an isothermal temperature profile along the axis of the carrier bed. The reactor temperature is measured by an axially placed thermocouple in the bottom, i.e. the outlet side, of the carrier bed.

The carrier bed is heated to 225° C. in a helium flow, at atmospheric pressure and a GHSV of 6000 $Nm^3$ gas/$m^3$ carrier bed/hour. At 225° C., a mixture of 1 vol % $H_2S$ and 0.5 vol % $SO_2$ in helium is contacted with the carrier bed at atmospheric pressure and a GHSV of 6000 $Nm^3/m^3/h$.

Sulphur vapour produced in the Claus reaction is removed from the product gas by condensation at 120° C. Subsequently, the sulphur free gas is dried. Methods to remove water vapour from gases are well known to persons skilled in the art. The $H_2S$ and $SO_2$ concentrations in the dry product gas are determined by gas chromatographic analysis.

After a stabilisation period of 24 hours, at 225° C. the product gas is analysed and the $H_2S$ and $SO_2$ conversions are calculated by approximation from the product gas analysis by the following formulas:

$H_2S$ conversion=
[(vol % $H_2S$-reactor-in-vol % $H_2S$-in-dry-product-gas)/(vol % $H_2S$-reactor-in)]*100%

$SO_2$ conversion=
[(vol % $SO_2$-reactor-in-vol % $SO_2$-in-dry-product-gas)/(vol % $SO_2$-reactor-in)]*100%

From this the average conversion is calculated: average conversion=($H_2S$ conversion+$SO_2$ conversion)/2

A carrier material is considered to have no substantial Claus activity if the average conversion is less than 20%.

Commercially available carrier materials almost invariably exhibit some Claus activity, even if the chemically pure carrier material is theoretically Claus inactive (viz. silica). This is due to traces of precursor materials from which the carrier is produced, or the presence of residual amounts of additives, for instance binders, which have been used to shape the carrier material.

EXAMPLES

Example 1

A commercial γ-$Al_2O_3$ catalyst carrier material was tested for Claus activity in an isothermal reactor according to the procedure described in the experimental part, γ-$Al_2O_3$ is well known for its Claus activity. The test data are summarised in table 1.

TABLE 1

| | |
|---|---|
| Feed gas | 1 vol % $H_2S$, 0.5 vol % $SO_2$ in He |
| GHSV | 6000 $Nm^3/m^3/h$ |
| Reactor temperature | 225° C. |
| Claus activity = average $H_2S$ and $SO_2$ conversion to sulphur | 94.5% |

Example 2

A commercial silica carrier material was tested for Claus activity as in example 1. With this material the average $H_2S$ and $SO_2$ conversion to sulphur was 12.5%.

Example 3

A Claus process gas containing 1.89 vol % $H_2S$, 0.62 vol % $SO_2$, 3.85 vol % $H_2$, 1.33 vol % CO and 30 vol % $H_2O$ was contacted with a standard Claus catalyst at 220° C., atmospheric pressure and a GHSV of 870 $Nm^3/m^3/h$. The product gas was fed to an isothermal reduction reactor, in series with the Claus reactor, containing a sulphided Co/Mo catalyst on a γ-$Al_2O_3$ carrier as in example 1. The fresh catalyst, in oxidised form (i.e. before sulphidation), contained 4 wt % CoO and 12 wt % $MoO_3$, based on the total weight of the catalyst. The B.E.T. surface area was 225 $m^2$/g catalyst. The reactor temperature was set at 225° C. The product gas composition was determined at three different GHSV's: 3000, 6000 and 9000 $Nm^3/m^3/h$. The results are shown in table 2.

With the Co/Mo catalyst on Claus active γ-$Al_2O_3$ considerable amounts of COS are formed under the prevailing experimental conditions.

TABLE 2

| | | Reduction reactor out | | |
|---|---|---|---|---|
| Component | Reduction reactor in | GHSV + 3000 $Nm^3/m^3/h$ | GHSV + 6000 $Nm^3/m^3/h$ | GHSV + 9000 $Nm^3/m^3/h$ |
| $H_2S$ (vol %) | 0.82 | 1.35 | 1.00 | 0.82 |
| $SO_2$ (vol %) | 0.076 | 0.005 | 0.010 | 0.011 |
| COS (vol %) | | 0.083 | 0.043 | 0.042 |
| S-vapour (vol % $S_1$) | 1.64 | 1.10 | 1.48 | 1.66 |
| $H_2$ (vol %) | 3.85 | | | |
| CO (vol %) | 1.33 | | | |
| $H_2O$ (vol %) | 31.1 | | | |

The $SO_2$ conversion is the net result of kinetically determined reduction and back formation from sulphur by the reversing Claus reaction:

$$3/nS_n + 2H_2O \rightleftharpoons 2H_2S + SO_2$$

Under the test conditions, the sulphur vapour in the feed and product gas is a mixture of mainly $S_2$, $S_n$ and $S_m$. The average value of n in $S_n$ at 225° C. is 7.42.

From thermodynamic data it can be calculated that, at a temperature of 225° C., the natural logarithm of the equilibrium constant for the reversing Claus reaction is:

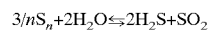

$$\ln(Kp) = \ln\{[(\text{vol }\% \ H_2S/100)^2 \times (\text{vol }\% \ SO_2/100)]/[\text{vol }\% \ S_{7.42}/100)^{3/7.42} \times (\text{vol }\% \ H_2O/100)^2]\} = -11.77$$

From the composition of the product gas leaving the reduction reactor an apparent ln(Kp) value can be calculated.

For the CoMo/γAl$_2$O$_3$ catalyst the apparent ln(Kp) values are −13.54, −13.57 and −13.92, at space velocities of 3000, 6000 and 9000 Nm$^3$/m$^3$/h respectively At low space velocity, the apparent ln(Kp) approaches the thermodynamic equilibrium value, indicating an increasing influence of the Claus reaction. Although the SO$_2$ content in the product gas is still low, due to the high reduction activity, the interference with the reversing Claus reaction, suppresses the SO$_2$ conversion to some extent.

At high space velocities, the apparent ln(Kp) deviates more and more from the thermodynamic equilibrium value. In this regime, the SO$_2$ conversion is determined by the kinetics of the reduction reaction.

Example 4

The experiment as in example 3 was repeated with sulphided Mo on the same silica carrier as tested in example 2. The fresh catalyst, in oxidised form, contained 6 wt % MoO$_3$, based on the total weight of the catalyst. The B.E.T. surface area was 250 m$^2$/g catalyst. As was shown in example 2, the silica carrier exhibits no substantial Claus activity.

The product gas composition was determined at two GHSV's: 6000 and 9000 Nm$^3$/m$^3$/h. The results are shown in table 3.

Compared to Co/Mo on Claus active γ-Al$_2$O$_3$, the catalyst on Claus inactive silica produces far less COS.

The apparent ln(Kp) values at 6000 and 9000 Nm$^3$/m$^3$/h are −14.25 and −13.84 respectively. These figures clearly show that the SO$_2$ conversion is less influenced by Claus activity than Co/Mo on γAl$_2$O$_3$, resulting in significantly lower SO$_2$ emissions from the reduction reactor at medium space velocity. At the high end of the space velocity range, the kinetics of SO$_2$ reduction is the limiting factor. Therefore, the performance of both catalysts is roughly the same at 9000 Nm$^3$/m$^3$/h.

TABLE 3

| Component | Reduction reactor in | Reduction reactor out GHSV = 6000 Nm$^3$/m$^3$/h | Reduction reactor out GHSV = 9000 Nm$^3$/m$^3$/h |
|---|---|---|---|
| H$_2$S (vol %) | 0.82 | 1.06 | 0.82 |
| SO$_2$ (vol %) | 0.076 | 0.0045 | 0.0012 |
| COS (vol %) | | 0.0081 | 0.0086 |
| S-vapour (vol % S$_1$) | 1.64 | 1.46 | −1.69 |
| H$_2$ (vol %) | 3.85 | | |
| CO (vol %) | 1.33 | | |
| H$_2$ (vol %) | 31.1 | | |

Example 5

The experiment as in example 3 was repeated with a sulphided commercial Co/Mo catalyst on γ-Al$_2$O$_3$. The fresh catalyst, in oxidised form, contained 2.5 wt % CoO and 9 wt % MoO$_3$, based on the total weight of the catalyst. The B.E.T. surface area was 330 m$^2$/g catalyst.

The product gas composition was determined at two GHSV's: 3000 and 9000 Nm$^3$/m$^3$/h. The results are shown in table 4.

Compared to Co/Mo catalyst on γ-Al$_2$O$_3$ in example 3, the commercial Co/Mo/γ-Al$_2$O$_3$ catalyst, with a different Co and Mo content and surface area, exhibits the same behaviour.

The commercial catalyst also produces considerable amounts of COS. The apparent ln(Kp) values are −13.38 and −14,13, at space velocities of 3000 and 9000 Nm$^3$/m$^3$/h respectively. At low space velocity, the SO$_2$ conversion is therefore limited by interference with the reversing Claus reaction, as was the case with the Claus active catalyst in example 3

TABLE 4

| Component | Reduction reactor in | Reduction reactor out GHSV = 3000 Nm$^3$/m$^3$/h | Reduction reactor out GHSV = 9000 Nm$^3$/m$^3$/h |
|---|---|---|---|
| H$_2$S (vol %) | 0.82 | 1.20 | 0.82 |
| SO$_2$ (vol %) | 0.076 | 0.0080 | 0.0090 |
| COS (vol %) | | 0.0175 | 0.0255 |
| S-vapour (vol % S$_1$) | 1.64 | 1.31 | 1.68 |
| H$_2$ (vol %) | 3.85 | | |
| CO (vol %) | 1.33 | | |
| H$_2$O (vol %) | 31.1 | | |

Example 6

The experiment as in example 3 was repeated with a sulphided commercial Ni/Mo catalyst on Claus active γ-Al$_2$O$_3$. The composition of the catalyst in oxidised form was specified as NiO:<25 wt % and MoO$_3$: 10–25 wt %, based on the total weight of the catalyst.

The product gas composition was determined at two GHSV's: 3000 and 9000 Nm$^3$/m$^3$/h. The results are shown in table 5.

TABLE 5

| Component | Reduction reactor in | Reduction reactor out GHSV = 3000 Nm$^3$/m$^3$/h | Reduction reactor out GHSV = 9000 Nm$^3$/m$^3$/h |
|---|---|---|---|
| H$_2$S (vol %) | 0.82 | 1.40 | 0.85 |
| SO$_2$ (vol %) | 0.076 | 0.0070 | 0.0175 |
| COS (vol %) | | 0.0502 | 0.0300 |
| S-vapour (vol % S$_1$) | 1.64 | 1.08 | 1.64 |
| H$_2$ (vol %) | 3.85 | | |
| CO (vol %) | 1.33 | | |
| H$_2$O (vol %) | 31.1 | | |

Under the prevailing experimental conditions Ni/Mo on γ-Al$_2$O$_3$ produces considerable amounts of COS. The apparent ln(Kp) values for Ni/Mo-γAl$_2$O$_3$ are −13.13 and −13.38, at space velocities of 3000 and 9000 Nm$^3$/m$^3$/h respectively, indicating interference with the reversing Claus reaction.

From the experiments in example 3, 5 and 6 it follows that all catalysts on γ-Al$_2$O$_3$ exhibit basically the same behaviour, despite differences in metal oxide composition.

With each of these catalysts both the production of COS and the reversing Claus reaction interfere significantly with the reduction of SO$_2$ to H$_2$S and/or sulphur, as opposed to Mo on silica.

This clearly indicates that Claus activity of the carrier material is a determining factor in the catalyst performance.

Example 7

The effect of the CO content in the feed gas on COS formation was tested in the following experiment A Claus process gas containing 2 vol % H$_2$S, 1 vol % SO$_2$, 3.85 vol % H$_2$, 30 vol % H$_2$O and a variable amount of CO was contacted with a standard Claus catalyst at 225° C., atmospheric pressure and a GHSV of 870 Nm$^3$/m$^3$/h. The product gas was fed to an isothermal reduction reactor containing a sulphided Co/Mo catalyst on γ-Al$_2$O$_3$, identical to the catalyst in example 5. The COS content of the product gas from the reduction reactor was determined at a reactor temperature of 225° C. and a GHSV of 3000 Nm$^3$/m$^3$/h. The results are shown in table 6.

TABLE 6

| Vol % CO in the feed gas to the reduction reactor | Vol % COS in product gas from the reduction reactor |
|---|---|
| 1.34 | 0.0313 |
| 0.70 | 0.0082 |

The experiment shows that the COS production drops very rapidly with decreasing CO content of the feed gas.

It follows from this example that, when maximum SO$_2$ conversion is not required, catalysts on Claus active carriers perform satisfactory with feed gases having a low CO content. For high SO$_2$ conversions and feed gases having a high CO content, a catalyst on a Claus inactive carrier is preferred.

Example 8

A gas containing 0.83 vol % H$_2$S, 0.074 vol % S$_2$, 30 vol % H$_2$O, 3.85 vol % H$_2$ and 1.35 vol % CO was contacted, at 225° C., with sulphided CoMo on γ-Al$_2$O$_3$, identical to the catalyst in example 5. The feed gas was virtually identical to the feed gas of the reduction reactor in example 5. However, in the experiment of the present example, the feed gas contained no sulphur vapour.

The product gas composition was determined at two GHSV's: 3000 and 6000 Nm$^3$/m$^3$/h. The results are shown in table 7

TABLE 7

| | | Reduction reactor out | |
|---|---|---|---|
| Component | Reduction reactor in | GHSV = 3000 Nm$^3$/m$^3$/h | GHSV = 6000 Nm$^3$/m$^3$/h |
| H$_2$S (vol %) | 0.83 | 0.89 | 0.89 |
| SO$_2$ (vol %) | 0.074 | 0.00 | 0.00 |
| COS (vol %) | | 0.015 | 0.016 |
| S-vapour (vol % S$_1$) | 0 | | |
| H$_2$ (vol %) | 3.85 | | |
| CO (vol %) | 1.35 | | |
| H$_2$O (vol %) | 30 | | |

Comparison of table 4 and table 7 shows that hydrogenation of sulphur vapour is a major factor in the production of H$_2$S at low space velocities. With sulphur free feed gas, the H$_2$S content in the product gas decreases from 1.2 to 0.9 vol %. With no sulphur in the feed, the SO$_2$ content of the product gas drops below the detection level, due to the reduced conversion of sulphur vapour to H$_2$S and SO$_2$ in the reversing Claus reaction.

From this example it follows that for extremely high SO$_2$ conversion and minimum loss of sulphur recovery a separate reduction reactor with a preceding sulphur condenser is preferred over an integrate(d reactor, filled with two stacked layers of respectively a Claus catalyst and a reduction catalyst.

What is claimed is:

1. Process for the selective catalytic reduction of sulphur dioxide content of a gas mixture comprising sulfur dioxide, sulfur vapor, and at least 10 vol. % of water, in which process the gas mixture is passed over a sulphur resistant hydrogenation catalyst in sulphidic form, at a space velocity of at least 2000 h$^{-1}$, in the presence of a reducing component, in a molar ratio of reducing component to sulphur dioxide of more than 10 up to 100, at a temperature of 125° C. to 300° C., so as to produce a resulting gas mixture comprising less than 1.2 vol. % H$_2$S, followed by passing the gas mixture, after the said reduction, through a dry oxidation bed for the oxidation of sulphur compounds to elemental sulphur.

2. Process according to claim 1, wherein the catalyst is supported on a carrier material having substantially no activity towards the Claus reaction and having at least one sulphidic hydrogenation component applied to the surface of said carrier material.

3. Process according to claim 2, wherein the said hydrogenation component is selected from the group consisting of Cr, Mo, W, Mn, Te, Re, Fe, Co, Ni, Ru, Rh, Pd, Os, Ir and Pt.

4. Process according to claim 3, wherein the hydrogenation component is based on molybdenum, and/or tungsten and/or cobalt.

5. Process according to claim 4, wherein the hydrogenation component is a catalyst based molybdenum or tungsten on a silica support, preferably containing 0.1 to 50 wt. % of molybdenum or tungsten.

6. Process according to claim 2, wherein the carrier material is selected from the group consisting of silica, α-alumina, silica alumina, zirconia, carbon (fibres), carbides, phosphates and aluminium phosphate.

7. Process according to claim 1, wherein said space velocity is less than 12000 h$^{-1}$.

8. Process for the removal of sulphur contaminants from gas mixtures, said process comprising the steps of
converting part of the hydrogen sulphide into sulphur dioxide,
subjecting the mixture to the Claus reaction in at least one catalytic reactor,
subjecting the sulphur dioxide present in resultant gas mixture to a removal step using the process of claim 1,
selectively oxidising the hydrogen sulphide present in the resulting gas mixture to elemental sulphur.

9. Process according to claim 8, wherein the said step of selectively oxidising is carried out in a dry oxidation bed.

10. Process according to claim 3, wherein the carrier material is selected from the group consisting of silica, α-alumina, silica alumina, zirconia, carbon (fibres), carbides, phosphates and aluminium phosphate.

11. Process according to claim 4, wherein the carrier material is selected from the group consisting of silica, α-alumina, silica alumina, zirconia, carbon (fibres), carbides, phosphates and aluminium phosphate.

12. Process according to claim 5, wherein the carrier material is selected from the group consisting of silica, α-alumina, silica alumina, zirconia, carbon (fibres), carbides, phosphates and aluminium phosphate.

13. Process according to claim 2, wherein said space velocity is less than 12000 h$^{-1}$.

14. Process according to claim 3, wherein said space velocity is less than 12000 h$^{-1}$.

15. Process according to claim 4, wherein said space velocity is less than 12000 h$^{-1}$.

16. Process according to claim 5, wherein said space velocity is less than 12000 h$^{-1}$.

17. Process according to claim 6, wherein said space velocity is less than 12000 h$^{-1}$.

18. Process for the removal of sulphur contaminants from gas mixtures, said process comprising the steps of converting part of the hydrogen sulphide into sulphur dioxide, subjecting the mixture to the Claus reaction in at least one catalytic reactor, subjecting the sulphur dioxide present in resultant gas mixture to a removal step using the process of claim 2.

19. Process for the removal of sulphur contaminants from gas mixtures, said process comprising the steps of converting part of the hydrogen sulphide into sulphur dioxide, subjecting the mixture to the Claus reaction in at least one catalytic reactor, subjecting the sulphur dioxide present in resultant gas mixture to a removal step using the process of claim 3.

20. Process for the removal of sulphur contaminants from gas mixtures, said process comprising the steps of converting part of the hydrogen sulphide into sulphur dioxide, subjecting the mixture to the Claus reaction in at least one catalytic reactor, subjecting the sulphur dioxide present in resultant gas mixture to a removal step using the process of claim 4.

21. Process for the removal of sulphur contaminants from gas mixtures, said process comprising the steps of converting part of the hydrogen sulphide into sulphur dioxide, subjecting the mixture to the Claus reaction in at least one catalytic reactor, subjecting the sulphur dioxide present in resultant gas mixture to a removal step using the process of claim 5.

22. Process for the removal of sulphur contaminants from gas mixtures, said process comprising the steps of converting part of the hydrogen sulphide into sulphur dioxide, subjecting the mixture to the Claus reaction in at least one catalytic reactor, subjecting the sulphur dioxide present in resultant gas mixture to a removal step using the process of claim 6.

23. Process for the removal of sulphur contaminants from gas mixtures, said process comprising the steps of converting part of the hydrogen sulphide into sulphur dioxide, subjecting the mixture to the Claus reaction in at least one catalytic reactor, subjecting the sulphur dioxide present in resultant gas mixture to a removal step using the process of claim 7.

24. Process according to claim 12, wherein said space velocity is less than $12000\ h^{-1}$.

25. Process for the removal of sulphur contaminants from gas mixtures, said process comprising the steps of converting part of the hydrogen sulphide into sulphur dioxide, subjecting the mixture to the Claus reaction in at least one catalytic reactor, subjecting the sulphur dioxide present in resultant gas mixture to a removal step using the process of claim 24.

26. Process according to claim 1, wherein said reducing component is at least partly consisting of hydrogen.

27. Process according to claim 1, wherein said space velocity is less than $10000\ h^{-1}$.

28. Process according to claim 2, wherein said space velocity is less than $10000\ h^{-1}$.

29. Process according to claim 3, wherein said space velocity is less than $10000\ h^{-1}$.

30. Process according to claim 4, wherein said space velocity is less than $10000\ h^{-1}$.

31. Process according to claim 5, wherein said space velocity is less than $10000\ h^{-1}$.

32. Process according to claim 6, wherein said space velocity is less than $10000\ h^{-1}$.

33. Process according to claim 12, wherein said space velocity is less than $10000\ h^{-1}$.

* * * * *

UNITED STATES PATENT AND TRADEMARK OFFICE
CERTIFICATE OF CORRECTION

PATENT NO. : 6,800,261 B1
APPLICATION NO. : 10/089578
DATED : October 5, 2004
INVENTOR(S) : Johannes Borsboom et al.

It is certified that error appears in the above-identified patent and that said Letters Patent is hereby corrected as shown below:

Column 1, line 27 (in equation), " $\rightleftharpoons$ " should read -- $\leftrightarrow$ --;

Column 1, line 31 (in equation), " $\rightleftharpoons$ " should read -- $\leftrightarrow$ --;

Column 1, line 53 (in equation), " $\rightleftharpoons$ " should read -- $\leftrightarrow$ --;

Column 1, line 66 (in equation), " $\rightleftharpoons$ " should read -- $\leftrightarrow$ --;

Column 2, line 10 (in equation), " $\rightleftharpoons$ " should read -- $\leftrightarrow$ --;

Column 4, line 12 (in equation), " $\rightleftharpoons$ " should read -- $\leftrightarrow$ --;

Column 6, line 26, "$S_2$" should read --$SO_2$--;

Column 6, line 32 (in equation), " $\rightleftharpoons$ " should read -- $\leftrightarrow$ --;

Column 6, line 48, "he" should read --be--;

Column 6, line 63, "$H_2$." should read --$H_2S$.--;

Column 7, line 46 (in equation), " $\rightleftharpoons$ " should read -- $\leftrightarrow$ --;

Column 10, line 61 (in equation), " $\rightleftharpoons$ " should read -- $\leftrightarrow$ --;

Column 10, line 64, "$S_n$ and $S_m$" should read --$S_6$ and $S_8$--;

Column 10, line 74 (in equation), "In" should read --1n--;

Column 11, line 47 in Table 3, "0.0012" should read --0.012--;

Column 11, line 49 in Table 3, "-1.69" should read --1.69--;

Column 11, line 52 in Table 3, "$H_2$" should read --$H_2O$--; and

UNITED STATES PATENT AND TRADEMARK OFFICE
CERTIFICATE OF CORRECTION

PATENT NO. : 6,800,261 B1
APPLICATION NO. : 10/089578
DATED : October 5, 2004
INVENTOR(S) : Johannes Borsboom et al.

It is certified that error appears in the above-identified patent and that said Letters Patent is hereby corrected as shown below:

Column 13, line 61, "integrate(d" should read --integrated--.

Signed and Sealed this

Fifteenth Day of August, 2006

JON W. DUDAS
*Director of the United States Patent and Trademark Office*